United States Patent [19]

Goto

[11] Patent Number: 5,106,405
[45] Date of Patent: Apr. 21, 1992

[54] HORTICULTURAL MEDIUM CONSISTING ESSENTIALLY OF NATURAL ZEOLITE PARTICLES

[75] Inventor: Itsuo Goto, Kawasaki, Japan

[73] Assignee: Soil Conservation Institute Co., Ltd., Sagamihara, Japan

[21] Appl. No.: 406,710

[22] Filed: Sep. 13, 1989

[30] Foreign Application Priority Data

Sep. 19, 1988 [JP] Japan .................. 63-232589

[51] Int. Cl.⁵ .......................... C05G 3/08; C05G 5/00
[52] U.S. Cl. ................................. 71/7; 71/13; 71/21; 71/64.13; 71/903; 71/904
[58] Field of Search ............. 71/7, 64.13, 13, 21, 71/903, 904

[56] References Cited

U.S. PATENT DOCUMENTS 4,772,307  9/1988  Kiss et al. ................. 71/13
4,963,431  10/1990  Goldstein et al. ............ 428/288

OTHER PUBLICATIONS

Derwent Abstract of Japanese Kokai Sho 53-22046.
Derwent Abstract of Japanese Kokai Sho 60-262886.
Derwent Abstract of Japanese Kokai Sho 62-262918.

*Primary Examiner*—Ferris Lander
*Attorney, Agent, or Firm*—Flynn, Thiel, Boutell & Tanis

[57] ABSTRACT

This invention is a mixed horticultural medium consisting essentially of natural zeolite particles, which has a unique property of capturing ammonium ions, and has a high nitrogen content as compared with conventionally available horticultural media thereby providing a high germentation percentage and having a nitrogen supply potential to meet requirements of plants with the aid of microorganisms in the soil.

12 Claims, No Drawings

HORTICULTURAL MEDIUM CONSISTING ESSENTIALLY OF NATURAL ZEOLITE PARTICLES

Background of the Invention

1. Field of the Invention

This invention relates to a horticultural medium consisting essentially of natural zeolite particles.

2. Prior Art

Artificial horticultural media consisting available in the market consist mainly of soils or the like prepared by adding various organic materials and fertilizer to the soils. Many of these media currently are granulated by using chemicals, and therefore have generally satisfactory physical properties.

However, the cation exchange capacity (CEC) of these soils are only about 20 to 50 meq/100 g, and therefore their fertilizer holding capacities are poor.

That is, they have fundamental drawbacks in their chemical properties.

A horticultural medium is required to be capable of providing a satisfactory germination percentage of embedded seeds and satisfactory growth of plants after germination. To increase the germination percentage, it is necessary to reduce the amount of fertilizer added to the soil and to maintain the electric conductivity (EC) of the soil as low as possible.

However, a low amount of fertilizer will cause a great problem as to the growth of plants after germination.

In many of the commercially available horticultural media, the nitrogen content is restricted to from 0.2 to 0.5 g/kg of the medium and an electric conductivity of less than about 1.5 mS/cm.

Further, most horticultural media in the market are processed by heat treatment during their production so that the amount of microorganisms in the media is very low.

Generally, horticultural plants take-up nitrate-nitrogen and utilize it as a nutrient. In upland fields, ammonium-nitrogen applied as fertilizer is converted to nitrate-nitrogen by nitrifying bacteria i.e., nitrite and nitrate forming bacteria, inhabiting the soil, and the plants take-up the nitrate.

But in commercially available horticultural media, however, such a nitrification process does not take place because there is no nitrifying bacteria therein.

Therefore, it is necessary to add nitrate-nitrogen to the horticultural media. But the nitrate-nitrogen can not be absorbed by the soil strongly, so it is readily leached out by watering after seeding thereby reducing the effect of the applied nitrogen fertilizer.

An objective of the present invention is to provide a mixed horticultural medium consisting essentially of natural zeolite particles which has the unique property of holding ammonium ions, and a nitrogen content of the medium is rich compared with the conventionally available horticultural media, thereby providing a high germentation percentage and having a nitrogen supply potential sufficient to meet requirements of plants with the aid of microorganisms in the medium.

DETAILED DESCRIPTION OF THE INVENTION

A summary of this invention is as follows;

1. A mixed horticultural medium consisting essentially of natural zeolite particles, containing nitrifying bacteria, nitrogen fertilizer, and phosphate fertilizer, if necessary, in which an ammonium-nitrogen content is 0.02 to 0.2 g/100 g, preferably 0.05 to 0.2 g/100 g, a nitrate-nitrogen content is 0.005 to 0.05 g/100 g a pH ($H_2O$) is 6.0 to 7.5, an electric conductivity is less than 2.0 mS/cm, and a cation exchange capacity is more than 50 meq/100 g, preferably 80 meq/100 g.

2. A mixed horticultural medium consisting essentially of natural zeolite particles, containing compost, and/or sludge from a water purification plant as nitrifying bacteria sources, pH conditioning material nitrogen fertilizer, and phosphate fertilizer if necessary, in which an ammonium-nitrogen content is 0.02 to 0.2 g/100 g, preferably 0.05 to 0.2 g/100 g, a nitrate-nitrogen content is 0.005 to 0.05 g/100 g, pH ($H_2O$) is 6.0 to 7.5, an electric conductivity is less than 2.0 mS/cm, and cation exchange capacity is more than 50 meq/100 g.

Further, a modification of the invention is as follows;

3. A mixed horticultural medium consisting essentially of 100 parts of natural zeolite particles, 10 to 40 parts of compost, 2 to 20 parts of sludge from a water purification plant, 0.2 to 5 parts of converter slag, 0.05 to 0.2 parts of nitrogen fertilizer as N, and 0.01 to 0.1 parts of phosphate fertilizer as $P_2O_5$, if necessary;

In the specification, parts indicates parts by weight.

According to the invention, if the ammonium-nitrogen content of the medium is less than 0.02 g/100 g, the effect of the added fertilizer is insufficient. On the other hand, if the ammonium-nitrogen content is greater than the value described above, the electric conductivity of the medium is too high to provide proper growth of plants and produces adverse effects on the growth of plants.

If the nitrate-nitrogen content is less than 0.005 g/100 g, the effect of the fertilizer is insufficient. If the nitrate-nitrogen content is greater than 0.05 g/100 g, the electric conductivity becomes greater than 2.0 mS/cm thereby lowering the germination percentage and the plants hardly take-up any nutrients.

If the pH ($H_2O$) is out of the range of 6.0 to 7.5, adverse effects on the growth of plant may be observed.

If the cation exchange capacity is less than 50 meq/100 g, sufficient fertilizer retention capacity can not be obtained.

METHODS OF MANUFACTURING THE HORTICULTURAL MEDIUM

The horticultural medium according to the invention is prepared as follows.

100 parts of natural zeolite particles are mixed with 10 to 60 parts of a nitrifying bacteria source, 0.2 to 20 parts of a pH conditioning material, 0.05 to 0.2 part of a nitrogen fertilizer, and 0.01 to 0.1 part of phosphatic fertilizer as $P_2O_5$, if necessary, and the mixture is blended.

In this way, the horticultural medium consisting essentially of natural zeolite particles according to the invention is obtained, which contains 0.02 to 0.2 g/100 g of ammonium-nitrogen ($NH_4^+$—N) preferably 0.05 to 0.2 g/100 g, 0.005 to 0.5 g/100 g of nitrate-nitrogen ($NO_3^-$—N) and the pH ($H_2O$) of the medium is 6.0 to 7.5, electric conductivity is less than 2.0 mS/cm and cation exchange capacity is more than 50 meq/100 g, preferably 80 to 200 meq/100 g.

Further the bulk density of the medium according to the invention is 0.7 to 0.9 and an available phosphorus content as $P_2O_5$ is 50 to 300 mg/100 g.

The definition of terms used in the specification is as follows; Natural Zeolite Natural zeolite is a group of crystalline hydrous tectosilicate minerals formed in volcanic glass formation in green tuff districts and characterized by an aluminosilicate tetrahedral framework.

It is denoted as $Me_{2/n}O.Al_2O_3.xSiO_2.yH_2O$ (Where Me stands for an alkali or alkali earth metal, n is electric charge valence on Me and x and y are coefficients) and natural zeolite consisting mainly of crynoptirolite or moldenite is particularly preferred to apply to the invention.

The natural zeolite particles are prepared by pulverizing zeolite stones and selecting particles having proper particle size, or by granulating.

Diameters of the zeolite particles are preferably about 0.5 to 2 mm.

The natural zeolite particles are porous having very fine cavities and of which the cation exchange capacity (CEC) is 50 to 200 meq/100 g.

The natural zeolite particles are used as basic material in this invention.

NITRIFYING BACTERIA

The nitrifying bacteria belong to aerobic bacteria, i.e., nitrite and nitrate forming bacteria.

Such nitrifying bacteria exist in compost in sludge from water purification plant and in soil.

It is possible to cultivate nitrifying bacteria separated from such nitrifying bacteria sources described above and to apply them to this invention.

The nitrifying bacteria oxidize ammonium-nitrogen and convert it to nitrate-nitrogen which plants take-up as nutrient.

A preferable number of the nitrifying bacteria is about $10^9$/g of medium of this invention.

A ratio of nitrifying bacteria sources to natural zeolite particles is preferably in a proportion of 10 to 60 parts to 100 parts of natural zeolite particles.

COMPOST

The compost is generally obtained by decomposing and rotting organic materials, such as fallen leaves, rice hulls, sawdust, straw boots, excrements of livestocks, such as cow, horse, swine, fowl, sewage, and bark, and contains a large amount of aerobic microorganisms, such as nitrifying microorganisms.

Further, it may include a zeolite compost, which consists of the organic materials described above and less than 30% of zeolite particles having a diameter smaller than 0.5 mm.

In a mixed horticultural medium of the present invention, preferably 10 to 40 parts of the compost is mixed with 100 parts of natural zeolite particles.

SLUDGE FROM A WATER PURIFICTION PLANT

The sludge from a water purification plant is obtained while purifying river surface water or lake water by adding aluminum compounds, e.g., poly aluminum chloride or aluminum sulfate, to the water, thereby coagulating and precipitating the suspended substances, and thickening and dehydrating the settled sludge.

This sludge is mainly composed of fine sand, silt, clay, planktons and other microorganisms and aluminum hydroxide gel derived from the coagulant.

In this sludge, a pH ($H_2O$) is 6.0 to 6.6, a total carbon content is approximately 6 to 17%, and a total nitrogen content is approximately 1.5 to 3.5%. A total aluminum content ($Al_2O_3$) is approximately 18 to 25%, and a soluble aluminum content ($Al_2O_3$), extracted by pH4, 1M sodium acetate, is approximately 3 to 15%. It has high anion-fixation capacity, and its phosphorus fixation capacity is particularly high.

When using this sludge from a water purification plant, it is suitably incorporated in an amount of 2 to 20 parts per 100 parts of natural zeolite particles.

Nitrogen Fertilizer

The nitrogen fertilizer added to the horticultural medium of this invention is suitably a chemical fertilizer, typically materials containing or for producing ammonium-nitrogen ($NH_4$—N), e.g., ammonium sulphate, ammonium phosphate, urea and calcium cyanamide.

As phosphorus ($P_2O_5$), which is added if necessary, superphosphate, concentrated superphosphate, etc., may be used when ammonium phosphate is used as the nitrogen fertilizer, however, there is no need for the extra addtion of phosphorus.

In this invention, 0.05 to 0.2 part of nitrogen N as the nitrogen fertilizer noted above, and 0.01 to 0.1 part of phosphorus ($P_2O_5$), if necessary, are added to 100 parts of natural zeolite particles.

Thus, the horticultural medium contains 0.005 to 0.05 g/100 g of nitrate-nitrogen formed by the aerobic bacteria, such as nitrifying bacteria, nitrifying the ammonium-nitrogen gradually derived from the fertilizer.

pH Conditioning Material

With the horticultural medium according to the invention, it is necessary to keep the pH at 6.0 to 7.5. Slag is used as a pH conditioning material. Converter slag, Blast furnace slag, calcium silicate, calcium carbonate, dolomite fossil shell, oyster shell, lime material, etc are also applicable. Of these materials, converter slag is particularly preferable for it contains micronutrients.

According to the invention, the pH of the horticultural medium may be held at 6.0 to 7.5, preferably 6.5 to 7.5, by using 0.2 to 20 parts of the pH conditioning materials shown above per 100 parts of natural zeolite particles.

Converter Slag

The converter slag used according to the invention is produced in a steel-production process as a result of the oxidization of impurities contained in pig iron as steel-making material and coupling of these impurities to assistant raw materials, e.g. quick lime, limestone, dolomite, etc. This mineral composition mainly contains 3 to 9% of CaO, 10 to 20% of $SiO_2$, 3 to 9% of MgO, 1 to 3% of total phosphoric acid (about one half of which is citrate soluble), 2 to 6% of citrate soluble MnO and 200 to 300 ppm of citrate soluble $B_2O_3$, and it also contains calcium silicate, calcium ferrite, Wustite, lime, etc. Thus, such converter slag usually has an alkalinity of about 50%.

These converter slag are usually used in the form of particles with a diameter of less than 2 mm.

According to the invention, the pH of the medium is adjusted to 6.0 to 7.5 by using 0.2 to 20 parts of the pH conditioning materials noted above, particularly 0.2 to 5 parts of converter slag when using the same, for 100 parts of natural zeolite particles.

The horticultural medium consisting essentially of natural zeolite particles according to the invention can be used as a nursery bed providing nutrients to plants, and also can be used in combination with other soils, for instance peatmoss, vermiculite, perlite, upland soil, mountain soil and other components.

The horticultural medium mainly composed of natural zeolite particles according to the invention can be suitably used not only for seedlings of various vegetables, flowers and fruit trees but also bed cultivation and pot cultivation.

Natural zeolite particles can hold water or air in numerous micropores on their surfaces and thus maintain satisfactory physical conditions of the medium without granulation treatment.

Further, their micropores are substantially equal in size to ammonium ions which can be trapped in the micropores. In other words, a unique property of capturing ammonium ions is provided. Thus, ammonium ions present in compost or in sludge from water purification plant or added as fertilizer or produced by the action of micropores, are trapped in zeolite microavites and dissolved only slightly in the liquid phase, so that the electric conductivity of the medium can be maintained low.

Ammonium ions dissolved in the liquid is oxidized in small quantities into nitrate by nitrifying bacteria (i.e., nitrite and nitrate forming bacteria).

While nitrates are taken-up by plants, since they are anionic, they are hardly absorbed in the soil and readily leached out during rainy weather conditions. According to the invention, nitrate, when generated, are absorbed in the sludge from a water purification plant, and their loss is reduced. Besides, the generated nitrate are quickly taken-up by plants. Thus, loss of nitrogen can be minimized, and it is possible to make effective use of the nitrogen. Furthermore, since natural zeolite contains a lot of potassium (K), there is no need for the extra addition of potassic fertilizer.

Further, according to the invention, a suitable amount of pH conditioning materials are employed. Thus, the horticultural medium according to the invention can be substantially neutral with its pH held at 6.0 to 7.5, preferably 6.5 to 7.5. Particularly, converter slag added as the pH conditioning material contains calcium silicate, free lime (CaO), magnesium (MgO), phosphorus, manganese, boron, etc. in adequate contents, so that there is no need for adding phosphorus or micronutrient fertilizer.

As has been shown, the horticultural medium according to the invention has an excellent porous structure, is comparatively light in weight, and contains nitrogen, phosphorus, calcium and other necessary miscronutrient fertilizer in adequate amounts so that these components provide proper action when required, is free from loss of effective components and can maintain a substantially neutral pH.

EXAMPLE 1

A horticultural medium according to the invention was prepared by adding 0.2 kg of compost, 0.05 kg of sludge from water purification plant, 5 g of converter slag, 5 g of ammonium phosphate and 1 g of concentrated superphosphate to 0.75 kg of natural zeolite mainly composed of crynoptirolite and in a grain size range of 0.5 to 1.0 mm.

This soil contained 154 mg/100 g of ammonium-nitrogen and 21 mg/100 g of nitrate-nitrogen, and it has an electric conductivity of 1.6 mS/cm and a cation exchange capacity of 140 meq/100 g.

0.5 litter of this medium according to the invention and three different nursery medium obtained in the market were filled in a polyvinyl chloride pot. In these media tomatos were grown 30 days in a greenhouse made of glass.

With the medium according to the invention the germination percentage was 100%. In addition, with the medium according to the invention, better growth could be obtained than with any of the nursery medium obtained in the market as shown in Table 1. Further, according to the invention, a great amount of nitrogen was taken-up by the tomato seedling.

Total ammonium and nitrate nitrogen, phosphorus content, pH, electric conductivity and cation exchange capacity of the media were determined in compliance with "Standards Analysis of Soils", Nov. 15, 1986, Hakuyusha Inc.

TABLE 1

| Growth of and taken-up amount of nitrogen by the tomato | | | |
| --- | --- | --- | --- |
| Soil | Growth (g) | Thickness of stalk (m m) | Taken-up amount of nitrogen (N mg per seedling) |
| Soil according to the invention | 35.9 | 8.2 | 134 |
| Commercially nursery medium A | 26.6 | 7.1 | 100 |
| Commercially nursery medium B | 20.0 | 6.5 | 59.0 |
| Commercially nursery medium C | 22.9 | 6.8 | 91.3 |

EXAMPLE 2

A horticultural medium according to the invention, prepared by adding 0.2 kg of compost, 0.1 kg of sludge from a water purification plant, 2.5 g of converter slag and 5 g of ammonium phosphate to 0.7 kg of natural zeolite, mainly composed of crynoptirolite and in a grain size range of 0.5 to 1.0 mm, and three different commercially nursery medium were subjected to analysis of physical and chemical properties.

As shown in table 2, with the soil according to the invention, the inorganic nitrogen content was 4.8 to 8.3 times those of the commercially available media although the electric conductivity was about 1 mS/cm, comparable to or lower than those of the commercially available nursery media. Further, the cation exchange capacity, exchangeable potassium content and available phosphorus content were higher than those of the commercially available nursery media.

The medium according to the invention and commercially available nursery medium A, capable of providing for the best growth among the commercially available nursery medium used in Example 1, were each used in an amount of 0.5 litter in a polyvinyl chloride pot, and tomato was seeded in these soils and grown for 37 days in a greenhouse. Table 3 shows the results. With the medium according to the invention, growth above ground, the root weight and take-up amount of nitrogen were respectively 1.5, 1.8 and 1.4 times than the commercially available nursery medium.

TABLE 2

| Soil | Physical and chemical properties of soil | | | | | | | |
|---|---|---|---|---|---|---|---|---|
| | Bulk density | pH (H$_2$O) | Electric conductivity (mS/cm) | Inorganic nitrogen (mg/100 g) | | Available phosphorus P$_2$O$_5$ mg/100 g | Exchangeable potassium K$_2$O mg/100 g | Cation exchange capacity meq/100 g |
| | | | | NH$_4^+$—N | NO$_3^+$—N | | | |
| Soil according to the invention | 0.80 | 7.4 | 0.98 | 143 | 19.2 | 212 | 2277 | 143 |
| A | 0.86 | 6.7 | 2.21 | 28.8 | 5.0 | 33.9 | 113 | 37.4 |
| B | 0.75 | 5.9 | 1.01 | 15.5 | 4.1 | 28.0 | 78.1 | 26.5 |
| C | 0.73 | 6.7 | 0.63 | 21.1 | 7.3 | 45.1 | 69.1 | 46.4 |

A: Commercially nursery medium A
B: Commercially nursery medium B
C: Commercially nursery medium C

TABLE 3

| | Growth of and uptaken amount of nitrogen by the tomato | | | | |
|---|---|---|---|---|---|
| Soil | Height (cm) | Growth above ground (g per seedling) | Root weight (g per seedling) | Stalk diameter (m m) | Uptaken amount of nitrogen (mg per seedling) |
| Soil according to the invention | 48.9 | 50.6 | 11.6 | 7.7 | 256 |
| A | 41.1 | 33.5 | 6.4 | 7.3 | 182 |

A: Commercially nursery medium A

The horticultural medium according to the invention is an ideal medium for germination and growing and consists essentially of natural zeolite particles, containing nitrifying bacteria, nitrogen fertilizer and phosphatic fertilizer, if necessary, in which a content of ammonium-nitrogen is 0.02 to 0.2 g/100 g, the a nitrate-nitrogen content is 0.005 to 0.05 g/100 g, pH (H$_2$O) is 6.0 to 7.5, an electric conductivity (EC) is less than 2.0 mS/cm, and a cation exchange capacity (CEC) is more than 50 meq/100 g.

In the Soil Productivity Improvement Law, Zeolite is designated as a soil-amedment material for enhancing the fertilizer retention capacity of soil. In the general practice of applying natural zeolite to farmland, zeolite is applied in an amount of 0.5 to 1 ton per 1000 square meter.

But, according to the present invention with the mixed horticulture medium used as media for growing seedling of vegetables, a growth result is almost equivalent to the result of natural zeolite, as described above after rooting of the seedling, thus improving the fertilizer retaining ability of the soil. It is to be understood that the invention seeks to make multi-purpose agricultural utility of zeolite, which is a natural resource in Japan, thus contributing to the effective use of natural resources.

What is claimed is:

1. A mixed horticultural medium consisting essentially of natural zeolite particles having a diameter of from about 0.5 to 2 mm, nitrifying bacteria and nitrogen fertilizer, said mixed horticultural medium having an ammonium-nitrogen content of 0.02 to 0.2 g/100 g, a nitrate-nitrogen content of 0.005 to 0.05 g/100 g, a pH (H$_2$O) of 6.0 to 7.5, an electrical conductivity of less than 2.0 mS/cm and a cation exchange capacity of more than 50 meg/100 g.

2. In a method of growing a plant in a horticultural medium, the improvement comprising said horticultural medium consisting of the mixed horticultural medium of claim 1.

3. A mixed horticultural medium consisting essentially of natural zeolite particles having a diameter of from about 0.5 to 2 mm, nitrifying bacteria, nitrogen fertilizer and phosphate fertilizer, said mixed horticultural medium having an ammonium-nitrogen content of 0.02 to 0.2 g/100 g, a nitrate-nitrogen content of 0.005 to 0.05 g/100 g, an available phosphorus content as P$_2$O$_5$ of 50 to 300 mg/100 g, a pH (H$_2$O) of 6.0 to 7.5, an electrical conductivity of less than 2.0 mS/cm and a cation exchange capacity of more than 50 meg/100 g.

4. In a method of growing a plant in a horticultural medium, the improvement comprising said horticultural medium consisting of the mixed horticultural medium of claim 3.

5. A mixed horticultural medium consisting essentially of natural zeolite particles having a diameter of from about 0.5 to 2 mm, a nitrifying bacteria source consisting of a member selected from the group consisting of compost, sludge from a water purification plant, and mixtures thereof, a pH conditioning material and a nitrogen fertilizer, said mixed horticultural medium having an ammonium-nitrogen content of 0.02 to 0.2 g/100 g, a nitrate-nitrogen content of 0.005 to 0.05 g/100 g, a pH (H$_2$O) of 6.0 to 7.5, an electrical conductivity of less than 2.0 mS/cm and a cation exchange capacity of more than 50 meg/100 g.

6. In a method of growing a plant in a horticultural medium, the improvement comprising said horticultural medium consisting of the mixed horticultural medium of claim 5.

7. The mixed horticultural medium of claim 5, consisting essentially of 100 parts by weight of natural zeolite particles, 10 to 40 parts by weight of compost, 2 to 20 parts by weight of sludge from a water purification plant, 0.2 to 5 parts by weight of converter slag and 0.05 to 0.2 parts by weight of nitrogen fertilizer as N.

8. In a method of growing a plant in a horticultural medium, the improvement comprising said horticultural medium consisting of the mixed horticultural medium of Claim 7.

9. A mixed horticultural medium consisting essentially of natural zeolite particles having a diameter of from about 0.5 to 2 mm, a nitrifying bacteria source consisting of a member selected from the group consisting of compost, sludge from a water purification plant, and mixtures thereof, a pH conditioning material, a nitrogen fertilizer and a phosphate fertilizer, said mixed horticultural medium having an ammonium-nitrogen content of 0.02 to 0.2 g/100 g, a nitrate-nitrogen content of 0.005 to 0.05 g/100 g, an available phosphorus content as $P_2O_5$ of 50 to 300 mg/100 g, a pH ($H_2O$) of 6.0 to 7.5, an electrical conductivity of less than 2.0 mS/cm and a cation exchange capacity of more than 50 meg/100 g.

10. In a method of growing a plant in a horticultural medium, the improvement comprising said horticultural medium consisting of the mixed horticultural medium of Claim 9.

11. The mixed horticultural medium of Claim 9, consisting essentially of 100 parts by weight of natural zeolite particles, 10 to 40 parts by weight of compost, 2 to 20 parts by weight of sludge from a water purification plant, 0.2 to 5 parts by weight of converter slag, 0.05 to 0.2 parts by weight of nitrogen fertilizer as N and 0.01 to 0.1 parts by weight of phosphate fertilizer as $P_2O_5$.

12. In a method of growing a plant in a horticultural medium, the improvement comprising said horticultural medium consisting of the mixed horticultural medium of Claim 11.

* * * * *

UNITED STATES PATENT AND TRADEMARK OFFICE
CERTIFICATE OF CORRECTION

PATENT NO. : 5 106 405
DATED : April 21, 1992
INVENTOR(S) : Itsuo GOTO

It is certified that error appears in the above-identified patent and that said Letters Patent is hereby corrected as shown below:

Column 7, line 66; change "meg" to ---meq---.
Column 8, line 28; change "meg" to ---meq---.
line 44; change "meg" to ---meq---.
Column 9, line 4; change "meg" to ---meq---.

Signed and Sealed this

Fourth Day of January, 1994

Attest:

BRUCE LEHMAN

Attesting Officer    Commissioner of Patents and Trademarks